US011023597B2

(12) United States Patent
Chen et al.

(10) Patent No.: US 11,023,597 B2
(45) Date of Patent: Jun. 1, 2021

(54) PROVIDING SECURITY TO MOBILE DEVICES VIA IMAGE EVALUATION OPERATIONS THAT ELECTRONICALLY ANALYZE IMAGE DATA RECEIVED FROM CAMERAS OF THE MOBILE DEVICES

(71) Applicant: Citrix Systems, Inc., Fort Lauderdale, FL (US)

(72) Inventors: Hao Chen, Nanjing (CN); Liming Wang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/764,716

(22) PCT Filed: Feb. 22, 2018

(86) PCT No.: PCT/CN2018/076967
§ 371 (c)(1),
(2) Date: Mar. 29, 2018

(87) PCT Pub. No.: WO2019/161530
PCT Pub. Date: Aug. 29, 2019

(65) Prior Publication Data
US 2020/0242260 A1   Jul. 30, 2020

(51) Int. Cl.
*G06F 21/00*        (2013.01)
*G06F 21/62*        (2013.01)
(Continued)

(52) U.S. Cl.
CPC .............. *G06F 21/62* (2013.01); *G06K 9/46* (2013.01); *H04W 12/03* (2021.01); *G06K 2209/01* (2013.01)

(58) Field of Classification Search
CPC ...... G06F 21/62; G06K 9/46; G06K 2209/01; H04W 12/001
See application file for complete search history.

(56) References Cited

U.S. PATENT DOCUMENTS

| 8,897,742 B2 | 11/2014 | Johnson |
| 9,298,914 B1 * | 3/2016 | McCorkendale ..... G06F 21/552 |

(Continued)

FOREIGN PATENT DOCUMENTS

| CN | 105930742 | 9/2016 |
| CN | 106296559 | 1/2017 |

(Continued)

OTHER PUBLICATIONS

International Search Report for International Application No. PCT/CN2018/076967 mailed from the International Searching Authority (CN) dated Nov. 9, 2018, 9 pages.

*Primary Examiner* — Jeffrey C Pwu
*Assistant Examiner* — William A Corum, Jr.
(74) *Attorney, Agent, or Firm* — BainwoodHuang (57) ABSTRACT

A technique provides mobile device security to a mobile device. The technique involves, in response to operation of a camera of the mobile device, receiving image data from the camera, the image data representing a visual image captured by the camera. The technique further involves performing an image evaluation operation which electronically analyzes the image data received from the camera to determine whether the image data contains sensitive information. The technique further involves, based on a result of the image evaluation operation, performing a security operation that provides security to the mobile device.

20 Claims, 5 Drawing Sheets

(51) Int. Cl.
    *G06K 9/46*       (2006.01)
    *H04W 12/03*    (2021.01)

(56) References Cited

U.S. PATENT DOCUMENTS

| | | |
|---|---|---|
| 9,374,374 B2 | 6/2016 | Steinberg et al. |
| 9,462,132 B2 | 10/2016 | Caulfield et al. |
| 9,760,724 B2 | 9/2017 | Frost |
| 9,858,428 B2 | 1/2018 | Barton et al. |
| 9,900,602 B2 | 2/2018 | Rangarajan et al. |
| 10,360,377 B2 * | 7/2019 | Song .................... G06F 21/554 |
| 2004/0091177 A1 * | 5/2004 | Eaton ...................... G06F 21/62 |
| | | 382/311 |
| 2016/0171242 A1 * | 6/2016 | Basavapatna ....... G06F 21/6245 |
| | | 726/27 |
| 2017/0068829 A1 * | 3/2017 | Shaw ................. H04N 1/32144 |
| 2018/0035045 A1 * | 2/2018 | Lai .......................... H04N 5/232 |
| 2018/0218170 A1 * | 8/2018 | Abi Antoun ........ G06F 21/6245 |
| 2019/0018977 A1 * | 1/2019 | Ohtake .............. G06F 16/2228 |
| 2019/0108506 A1 * | 4/2019 | Vokes .................. G06Q 20/102 |

FOREIGN PATENT DOCUMENTS

| | | |
|---|---|---|
| CN | 107247915 | 10/2017 |
| WO | 20090078554 | 6/2009 |
| WO | 20160024173 | 2/2016 |

* cited by examiner

PROVIDING SECURITY TO MOBILE DEVICES VIA IMAGE EVALUATION OPERATIONS THAT ELECTRONICALLY ANALYZE IMAGE DATA RECEIVED FROM CAMERAS OF THE MOBILE DEVICES

BACKGROUND

A conventional smartphone includes a microphone and a speaker, a processor, memory, and a wireless transceiver. Some smartphones are further provisioned with a touchscreen, a camera, and global positioning system (GPS) circuitry, among other things.

Such smartphones enable users to perform useful work while the users visit and/or travel between different locations. For example, a user may operate a smartphone to make and receive cellular calls. Additionally, a user may use a smartphone to capture pictures and store them locally and/or remotely. Furthermore, a user may use a smartphone to access email, text messages, documents, the Internet, and so on.

SUMMARY

Unfortunately, there are deficiencies to the above-described conventional smartphones which are equipped with cameras. For example, such a smartphone poses a security threat since the smartphone can be used to take photos and/or video clips in a corporate work environment resulting in leakage of proprietary corporate information.

To address such a security threat, some corporate work environments may ban all picture taking by smartphones or ban the use of smartphones outright. However, such heavy-handed banning results in global camera unavailability or global smartphone unavailability which may result in inconveniences as well as significant work inefficiencies.

In contrast to the above-described conventional smartphone situations which are vulnerable to leakage of proprietary corporate information or which heavy-handedly impose outright bans, improved techniques provide security to mobile devices by performing image evaluation operations that electronically analyze image data received from cameras of the mobile devices. Such image evaluation operations indicate whether image data from the mobile device cameras contain sensitive information (e.g., confidential text information). If such sensitive information is discovered within a mobile device, conveyance of the sensitive information may be blocked from reaching one or more downstream applications. Alternatively, the sensitive information may be permitted to reach one or more applications, but a remedial operation may be performed by the mobile device such as warning the user, entering the activity in an event log, sending a copy of the sensitive information to a central server, and so on. Suitable mobile devices include smartphones, tablets, laptop computers, generic bring your own devices (BYODs), and the like.

One embodiment is directed to a method of providing mobile device security which is performed in a mobile device. The method includes, in response to operation of a camera of the mobile device, receiving image data from the camera, the image data representing a visual image captured by the camera (e.g., a picture, a video clip, etc.). The method further includes performing an image evaluation operation which electronically analyzes the image data received from the camera to determine whether the image data contains sensitive information. The method further includes, based on a result of the image evaluation operation, performing a security operation that provides security to the mobile device.

In some arrangements, the method further includes, prior to receiving the image data from the camera, configuring processing circuitry of the mobile device to operate as a text extraction circuit that extracts text information from image information. In these arrangements, performing the image evaluation operation includes processing the image data received from the camera via the text extraction circuit to extract text data from the image data, and scanning the text data extracted from the image data for confidential text information.

In some arrangements, the method further includes, after configuring processing circuitry of the mobile device to operate as the text extraction circuit and prior to receiving the image data from the camera, acquiring scanning criteria from a set of external control servers. The scanning criteria defines requirements which distinguish confidential text information from non-confidential text information.

In some arrangements, acquiring the scanning criteria from the set of external control servers includes obtaining the scanning criteria from the set of external control servers via a wireless transmission that uses a wireless transceiver of the mobile device. Accordingly, the mobile device is able to conveniently obtain periodic updates to the scanning criteria even if the mobile device changes locations.

In some arrangements, the scanning criteria from the set of external control servers includes a set of rules. In these arrangements, scanning the text data extracted from the image data for confidential text information includes applying the set of rules to the text data extracted from the image data to discern confidential text information within the text data.

In some arrangements, the image evaluation operation provides an image evaluation operation result signal. In these arrangements, performing the security operation that provides security to the mobile device includes, in response to the image evaluation operation result signal indicating presence of confidential text information within the text data, blocking conveyance of at least some of the image data from the camera to a set of applications running on the mobile devices.

In some arrangements, the camera captures the image data in response to a control signal from a particular application. In these arrangements, blocking conveyance includes, in response to the image evaluation operation result signal indicating the presence of the confidential text information within the text data, preventing at least a portion of the image data from being accessed by the particular application.

In some arrangements, preventing includes, in response to the image evaluation operation result signal indicating the presence of the confidential text information within the text data, inhibiting invocation of the particular application. In these arrangements, the particular application is not initiated or stopped from running to prevent exposure of the confidential text information.

In some arrangements, preventing includes, in response to the image evaluation operation result signal indicating the presence of the confidential text information within the text data, generating modified data that represents the visual image captured by the camera and that excludes the confidential text information, and providing the modified data to the particular application. In these arrangements, only the modified data which does not include the confidential text information is allowed to reach the particular application.

In some arrangements, preventing includes, in response to the image evaluation operation result signal indicating the presence of the confidential text information within the text data, outputting a warning on a display screen of the mobile device. In these arrangements, the warning informs a user of the mobile device that (i) the image data received from the camera contains confidential text information and (ii) the confidential text information has not been provided to the particular application.

In some arrangements, the image evaluation operation provides an image evaluation operation result signal. In these arrangements, performing the security operation that provides security to the mobile device includes, in response to the image evaluation operation result signal indicating presence of confidential text information within the text data, performing a remedial security operation while the particular application receives the image data for processing.

In some arrangements, performing the remedial security operation while the particular application receives the image data for processing includes, in response to the image evaluation operation result signal indicating the presence of the confidential text information within the text data, sending a report message to the set of external control servers. In these arrangements, the report message includes the confidential text information.

In some arrangements, performing the remedial security operation while the particular application receives the image data for processing includes, in response to the image evaluation operation result signal indicating the presence of the confidential text information within the text data, sending a report message to the set of external control servers. In these arrangements, the report message includes a copy of the image data that is received by the particular application.

In some arrangements, performing the remedial security operation while the particular application receives the image data for processing includes, in response to the image evaluation operation result signal indicating the presence of the confidential text information within the text data, logging a confidential text information release event entry within a security event database within the mobile device. Accordingly, the mobile device is able to collect a history of confidential text information release events over time for further remedial activity (e.g., prevent at other locations, alert the user or other authorities, forensics, punishment, and so on).

In some arrangements, performing the remedial security operation while the particular application receives the image data for processing further includes periodically transmitting at least a most recent portion of the security event database to the set of external control servers via a wireless transmission that uses a wireless transceiver of the mobile device. Such operation enables the mobile device to collect events and relay the collected events elsewhere for remedial action.

In some arrangements, performing the remedial security operation while the particular application receives the image data for processing includes, in response to the image evaluation operation result signal indicating the presence of the confidential text information within the text data, outputting a warning on a display screen of the mobile device. The warning informs a user of the mobile device that (i) the image data contains confidential text information and (ii) the confidential text information has been provided to the particular application.

Another embodiment is directed to a computer program product having a non-transitory computer readable medium that stores a set of instructions to provide mobile device security. The set of instructions, when carried out by electronic circuitry of the mobile device, causing the electronic circuitry to perform a method of:

(A) in response to operation of a camera of the mobile device, receiving image data from the camera, the image data representing a visual image captured by the camera;

(B) performing an image evaluation operation which electronically analyzes the image data received from the camera to determine whether the image data contains sensitive information; and (C) based on a result of the image evaluation operation, performing a security operation that provides security to the mobile device.

Yet another embodiment is directed to a mobile device which includes a camera, memory which stores a local application, and control circuitry coupled to the camera and the memory. The memory stores instructions that, when carried out by the control circuitry, cause the control circuitry to:

(A) in response to operation of the camera, receive image data from the camera, the image data representing a visual image captured by the camera, (B) perform an image evaluation operation which electronically analyzes the image data received from the camera to determine whether the image data contains sensitive information, and (C) based on a result of the image evaluation operation, perform a security operation that provides security to the mobile device.

It should be understood that, in the cloud context, some electronic circuitry such as one or more of the external control servers may be formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in providing security to mobile devices via image evaluation operations that electronically analyze image data received from cameras of the mobile devices.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing security to a mobile device by performing image evaluation operations that electronically analyze image data received from a camera of the mobile device. Such image evaluation operations indicate whether image data from the camera contains sensitive information (e.g., confidential text information). If such sensitive information from the camera is discovered within the mobile device, conveyance of the sensitive information may be blocked from reaching a downstream application. Alternatively, the sensitive information from the camera may be permitted to reach the downstream application, but a remedial operation may be performed by the mobile device such as warning the user, entering the activity in an event log, sending a copy to a central server, and so on. Examples of suitable mobile devices include smartphones, tablets, laptop computers, generic bring your own devices (BYODs), and the like.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
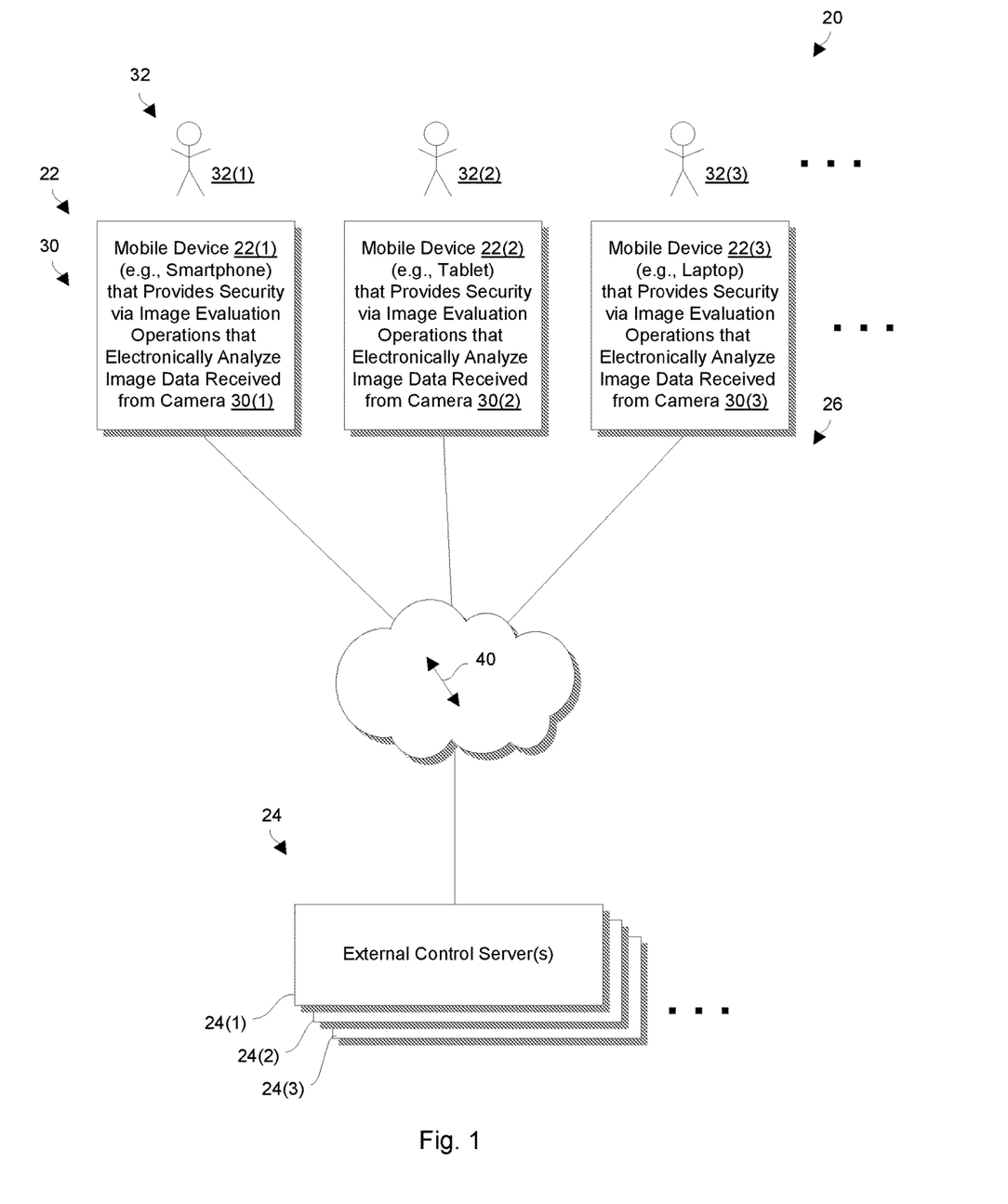
FIG. 1 is a block diagram of an electronic setting that is suitable for providing security to one or more mobile devices by performing image evaluation operations that electronically analyze image data received from cameras of the one or more mobile devices.

FIG. 1 shows an electronic setting 20 that provides security to mobile devices via image evaluation operations that electronically analyze image data received from cameras of the mobile devices. The electronic setting includes mobile devices 22(1), 22(2), 22(3), . . . (collectively, mobile devices 22), one or more external control servers 24(1), 24(2), 24(3), . . . (collectively, external control servers 24), and a communications medium 26.

Each mobile device 22 has access to at least one camera 30 and is constructed and arranged to enable a user 32 to perform useful work. For example, the mobile device 22(1) may be a smartphone that is equipped with a camera 30(1) and that is operated by user 32(1). Additionally, the mobile device 22(2) may be a tablet device that is equipped with a camera 30(2) and that is operated by user 32(2). Furthermore, the mobile device 22(3) may be a laptop computer that is equipped with a camera 30(3) and that is operated by user 32(3). Other equipment is suitable for use (e.g., wearable devices, personal assistant devices, specialized equipment, etc.) as well as long as such equipment includes smart processing circuitry and has access to a camera 30. Also, it is possible that a particular user 32 may operate more than one mobile device 22.

Each control server 24 is constructed and arranged to provide services to the mobile devices 22 (e.g., to distribute of security criteria, to gather security event history, to perform access control, etc.). Along these lines, each control server 24 may provide a different service. Alternatively, multiple control servers 24 may provide the same service, e.g., for load balancing, fault tolerance, etc.

The communications medium 26 is constructed and arranged to connect the various components of the electronic setting 20 together to enable these components to exchange electronic signals 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, cellular communications, plain old telephone service (POTS) communications, combinations thereof, and so on.

During operation and as will be explained in further detail shortly, the users 32 operate their respective mobile devices 22 to perform useful work. For example, the users 32 may operate their mobile devices 22 to participate in phone calls, send and receive text messages, and access email. Additionally, the users 32 may operate their mobile devices 22 to access browse the Internet, edit documents, and consume other resources and services. Furthermore, the users 32 may operate their mobile devices 22 to take pictures, create video clips, etc. using the cameras 30.

During such time, a set of external control servers 24 routinely delivers security criteria to the mobile devices 22 (e.g., weekly, nightly, hourly, in response to new updates, etc.). The mobile devices 22 then perform image evaluation operations based on the security criteria to determine whether image data from the cameras 30 contains sensitive information. The mobile devices 22 then impose security if such sensitive information is discovered in the image data from the cameras 30 (e.g., block the image data from being delivered to an application, replace the sensitive information within the image data, warn a user, alert the external control servers, and so on). Further details will now be provided with reference to FIG. 2.

Figure 2:
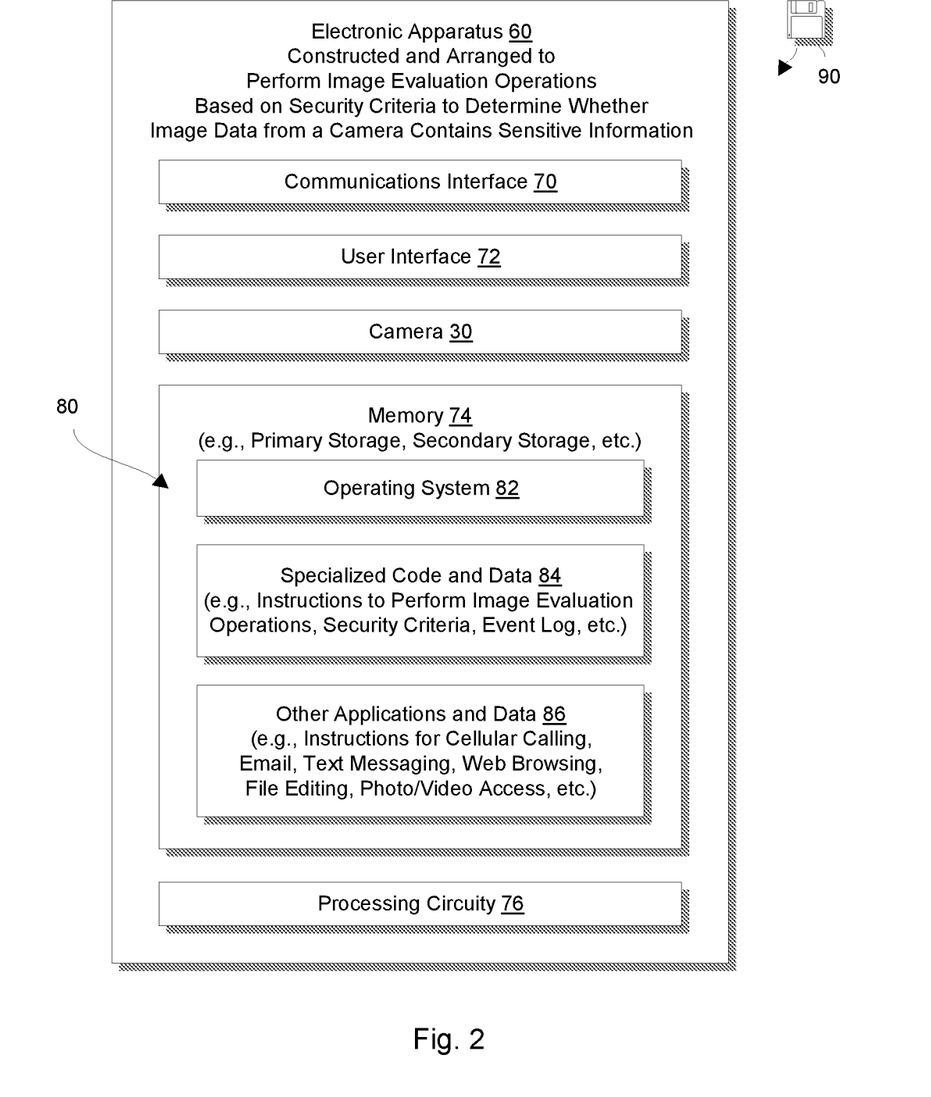
FIG. 2 is a block diagram illustrating particular details of a mobile device of FIG. 1.

FIG. 2 shows an electronic apparatus 60 which is suitable for use as a mobile device 22 of the electronic setting 20. The electronic apparatus 60 includes a communications interface 70, a user interface 72, a camera 30 (also see FIG. 1), memory 74, and processing circuitry 76.

The communications interface 70 (e.g., one or more wireless transceivers) is constructed and arranged to connect the electronic apparatus 60 to various communications media such as a cellular network, a wireless router to a computer network, Bluetooth devices, and so on. Accordingly, the communications interface 70 enables communications with the other apparatus (e.g., other mobile devices 22, external control servers 24, etc.). Such communications may be wireless or even line-based (e.g., radio frequency, fiber optic, infrared, via cables, combinations thereof, and so on).

The user interface 72 is constructed and arranged to receive input from a user 32 and provide output to the user 32 (also see FIG. 1). Examples components for the user interface 72 include a touchscreen, physical buttons, a microphone, a speaker, accelerometers, a vibration mechanism, a light emitting diode (LED), and so on.

The camera 30 is constructed and arranged to capture images and moving video (e.g., via a lens, an image sensor, etc.). In some arrangements, the camera 30 receives control from one or more another components of the electronic apparatus 60 (e.g., an operating system, a camera application, another user-level application, etc.). In some arrangements, the camera 30 is able to access one or more another components of the electronic apparatus 60 while capturing images and moving video (e.g., store image files and video clips in a folder of a file system, invoke another application, etc.).

The memory 74 is intended to represent both volatile storage and non-volatile storage (e.g., DRAM, SRAM, flash memory, EEPROM, etc.). The memory 74 stores a variety of software constructs 80 including an operating system 82, specialized code and data 84 that provides security, and other applications and data 86.

The processing circuitry 76 is constructed and arranged to operate in accordance with the various software constructs 80 stored in the memory 74. In particular, the processing circuitry 76, when executing the operating system 82, manages various resources of the electronic apparatus 60 (e.g., memory allocation, processor cycles, hardware compatibility, etc.). Additionally, the processing circuitry 76 operating in accordance with the specialized code and data 84 forms specialized control circuitry to perform image evaluation operations and impose security. Furthermore, the processing circuitry 76 operating in accordance with the other applications and data 86 enables a user 32 to carry out other operations and thereby perform useful work.

It should be understood that the above-mentioned processing circuitry 76 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic apparatus 60 (e.g., directly or perhaps through another device or peripheral component). The computer program product 90 has a non-transitory and non-volatile computer readable medium that stores a set of instructions to control one or more operations of the electronic apparatus 60. Examples of suitable computer readable storage media include tangible articles of manufacture and apparatus that store instructions in a non-volatile manner such as flash memory, CD-ROM, disk memory, tape memory, and the like. Further details will now be provided with reference to FIGS. 3 and 4.

Figure 3:
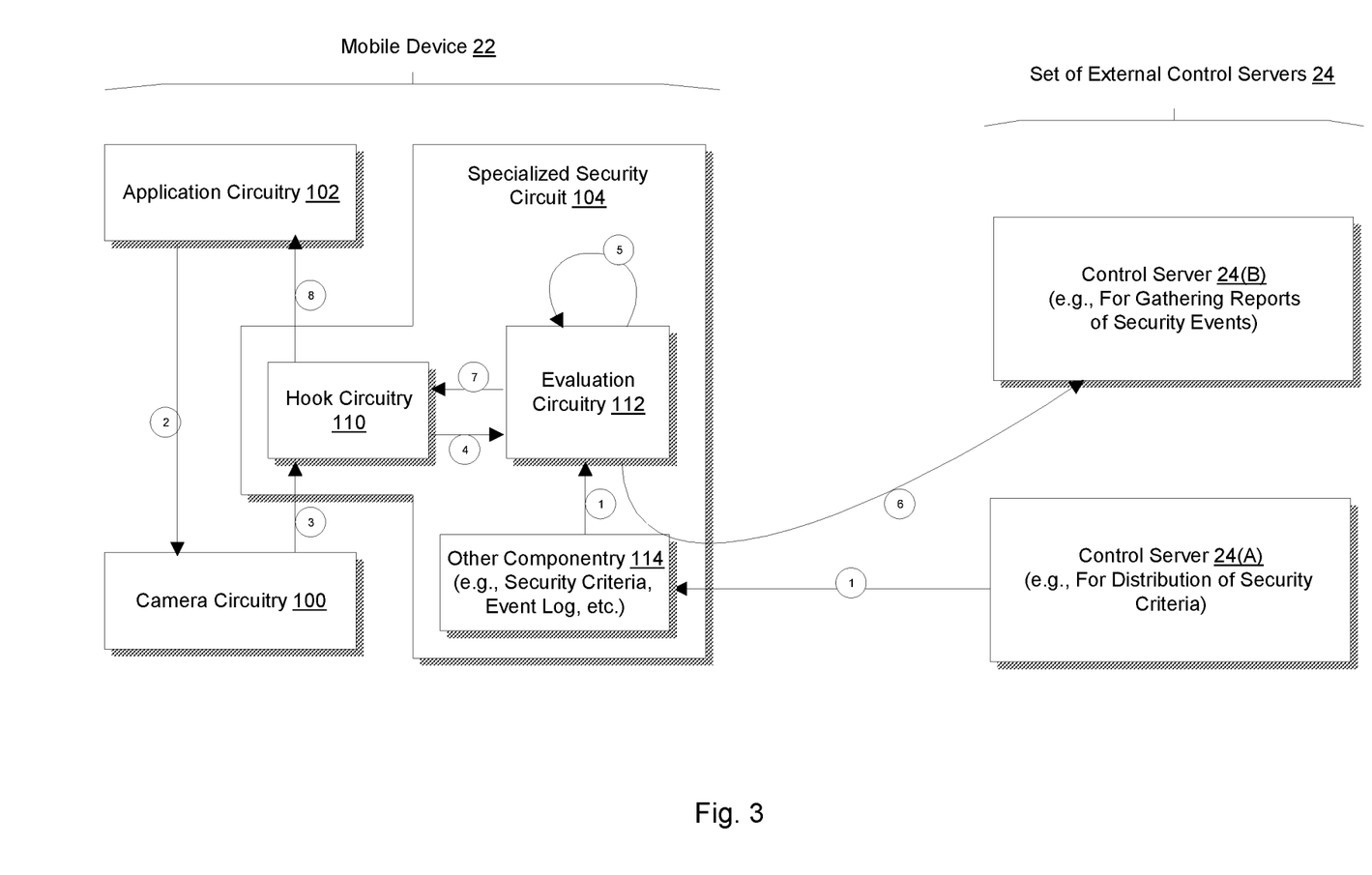
FIG. 3 is a block diagram showing particular activities that occur between a mobile device of FIG. 1 and a set of external control servers in accordance with certain embodiments.
Figure 4:
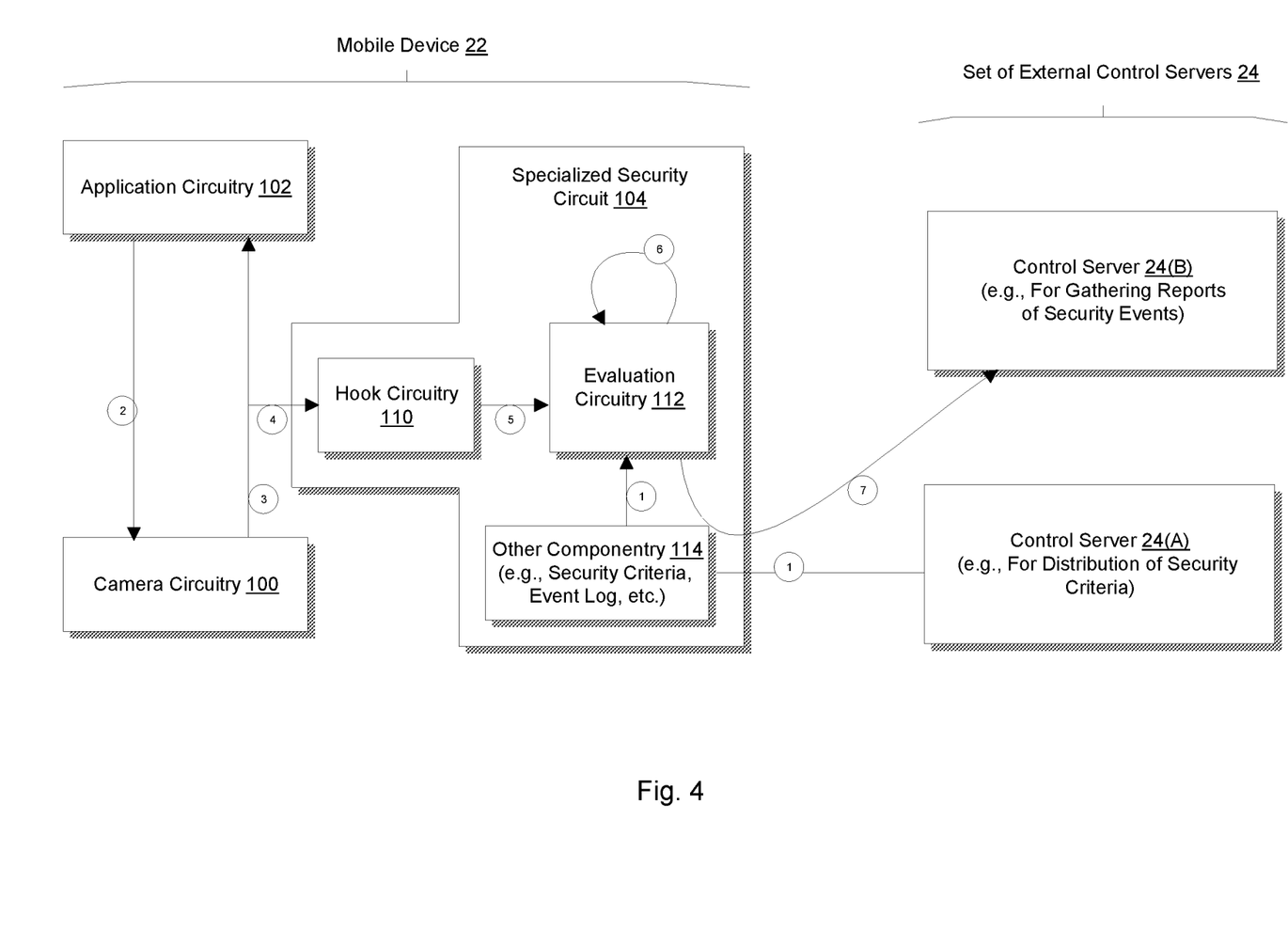
FIG. 4 is an alternative block diagram showing particular activities that occur between a mobile device of FIG. 1 and a set of external control servers in accordance with certain other embodiments.

FIGS. 3 and 4 show particular details of various circuitry of a mobile device 22 that performs image evaluation operations based on security criteria to determine whether image data from a camera 30 of the mobile device 22 contains sensitive information. FIG. 3 shows a first configuration for the various circuitry. FIG. 4 shows an alternative configuration for the various circuitry.

With reference to FIG. 3, the mobile device 22 includes, as the various circuitry, camera circuitry 100, application circuitry 102, and a specialized security circuit 104 which couples to the camera circuitry 100 and the application circuitry 102.

The camera circuitry 100 forms at least part of the mobile device camera 30 (also see FIGS. 1 and 2), and includes a set of sensors (e.g., charge-coupled devices or CCDs), a timer, a flash, and so on. During operation, the camera circuitry 100 is constructed and arranged to provide image data representing captured images (e.g., a single frame, a series of frames that forms a video clip, etc.).

The application circuitry 102 can be formed by the processing circuitry 76 operating in accordance with the other applications and data 86 (also see FIG. 2). Examples of suitable applications include a photo app for creating photos using the mobile device camera 30, a movie app for creating video clips using the mobile device camera 30, a texting app that attaches image data with a text message, and so on.

The specialized security circuit 104 includes hook circuitry 110, evaluation circuitry 112, and other componentry 114. These portions of the specialized security circuit 100 can be formed by the processing circuitry 76 operating in accordance with the specialized code and data 84 (FIG. 2).

It should be understood that, in some arrangements, certain circuits shown in FIG. 3 may be formed at different times by a single processor executing different code. In other arrangements, such circuits may be formed concurrently by multiple processors executing different code or by separate circuitry (e.g., dedicated integrated circuits or ICs).

As further shown in FIG. 3, the mobile device 22 is capable of communicating with a set of external control servers 24. Such communications may be wireless, cable based, or combinations thereof (also see the communications interface 70 in FIG. 2). By way of example only, the set of external control servers 24 includes a control server 24(A) for distributing security criteria to mobile devices 22, and a separate control server 24(B) for gathering reports of security events from the mobile devices 22. Other example services include enrollment, access control, mobile device management services, mobile application management services, and so on.

It should be understood that one or more of these services can be provided by a single control server 24. Furthermore, one or more of these services can be provided by multiple control servers 24 in a load balanced and/or fault tolerant manner (e.g., via a server farm).

In the configuration shown in FIG. 3, the hook circuitry 110 of the specialized security circuit 104 is interconnected between the camera circuitry 100 and the application circuitry 102. Accordingly, the specialized security circuit 104 is capable of intercepting image date en route from the camera circuitry 100 to the application circuitry 102. In some arrangements, the specialized security circuit 104 operates in an intrusive mode which allows the specialized security circuit 104 to prevent (i.e., block) image data from the camera circuitry 100 from reaching the application circuitry 102. In other arrangements, the specialized security circuit 104 operates in a non-intrusive mode which allows image data from the camera circuitry 100 to reach the application circuitry 102. In yet another arrangement, the specialized security circuit 104 operates selectively in either intrusive mode or non-intrusive mode based on control input from a user (e.g., via a control setting that places the specialized security circuit 104 in either the either intrusive mode or non-intrusive mode, based on user input after prompting a user 32 during each use of the camera circuitry 100, combinations thereof, and so on).

An example situation will now be provided. First, the control server 24(A) periodically sends security criteria to each mobile device 22 of the electronic setting 20 (e.g., see arrow 1 in FIG. 3). Such security criteria may then reside locally within a repository or cache of the specialized security circuit 104 (e.g., see the other componentry 114) which is accessed by the evaluation circuitry 112. That is, with the security criteria now available, the evaluation circuitry 112 is equipped to perform effective evaluation of image data for sensitive information.

It should be understood that the security criteria may include rules describing sensitive keywords and/or phrases to be monitored as well as other things (e.g., patterns, formats, conditions, statistics, etc.). Such security criteria is synchronized from the control server 24(A) down to the administered mobile device 22 and loaded by the evaluation circuitry 112 of the specialized security circuit 104. In some arrangements, the control server 24(A) distributes updated security criteria routinely (e.g., weekly, daily, hourly, etc.) and/or when new updates to the security criteria become available (e.g., initiated in a push notification manner). In other arrangements, each mobile device 22 routinely queries the control server 24(A) for updated security criteria. Other arrangements are suitable for use as well such as via a combination of push notifications and queries, in response to event triggered commands provided by the mobile device 22 and/or provided manually by the user 32, and so on.

Second, at some time during operation of the mobile device 22, the application circuitry 102 sends a control signal to the camera 30 to activate the camera circuitry 100 (arrow 2 in FIG. 3). Along these lines, the user 32 may invoke a camera application (e.g., a photo app or movie app) and then direct the mobile device 22 to take a picture or to start recording a video clip using the camera 30 of the mobile device 22. To this end, an application running on the mobile device 22 invokes the camera 30 to capture one or more image frames. The image data in each frame represents a visual image captured by the camera 30.

Third, in response to the control signal from the application circuitry 102, the camera circuitry 100 outputs the image data which is then intercepted by the hook circuitry 110 of the specialized security circuit 104 before the image data is able to reach the application circuitry 102 (arrow 3 of FIG. 3). Such image data may include a single frame of an image captured by the camera circuitry 100 (e.g., a picture). Alternatively, the image data may be a series of frames (e.g., a video clip). It should be understood that a variety of different formats are suitable for use (e.g., bitmaps, vectors, etc.).

Next, the hook circuitry 110 of the specialized security circuitry 104 sends the image data obtained from the camera circuitry 100 to the evaluation circuitry 112 of the specialized security circuitry 104 for evaluation (arrow 4 of FIG. 3). In some arrangements, the image data is buffered in a portion of memory (also see the memory 74 in FIG. 2) that cannot be accessed by the application circuitry 102.

The evaluation circuitry 112 then performs an image evaluation operation based on the security criteria that was received from the control server 24(A) to determine whether the image data contains sensitive information (arrow 5 of FIG. 3). In some arrangements, the evaluation circuitry 112 extracts text data from the image data (e.g., text strings from the image). Along these lines, the evaluation circuitry 112 may perform recognition operations on the image data (e.g., operations such as optical character recognition or OCR operations that are performed on electronic scans of text). Next, the evaluation circuitry 112 analyzes the text data for confidential text information. For example, the security criteria may include a set of rules, and the evaluation circuitry 112 parses and searches the text data for confidential text information. In some arrangements, the evaluation circuitry 112 applies the set of rules to the text data to search for confidential text information.

Such operation may discover a match between scanning criteria received from the set of external control servers 24 and extracted text data. Such a discovery indicates the presence of sensitive information within the image data.

It should be understood that such rules may define various sensitive text strings (e.g., sequences of alphanumeric characters), a set of keywords and/or phrases, text formats, patterns, and so on. An example of a sensitive text string is an actual predefined user password such as "Open123" which may be cryptographically concealed/protected within the special security circuit 104. An example of a sensitive set of keywords or phrases is an actual predefined confidential phrase such as "Project Delta". An example text format is a predefined arrangement of alphanumeric characters such as ###-##-#### for a social security number. Rules that define sensitive information in other ways, and other types of security criteria are suitable for use as well.

The evaluation circuitry 112 then provides an image evaluation operation result signal indicating whether the image data contains sensitive information (arrow 6 of FIG. 3). This image evaluation operation result signal is sent to a local log (e.g., see the other componentry 114) and/or the control server 24(B). For example, if the image evaluation operation result signal indicates that sensitive information is present in the image data, both the local log and the control server 24(B) may be immediately updated with information of the event (e.g., an alert, a copy of the image data, etc.). However, if the image evaluation operation result signal indicates that no sensitive information is present in the image data, perhaps only the local log is updated at the time of performing the image evaluation operation, and collected recent events in the local log are later sent in batches to the control server 24(B) periodically.

Additionally, the evaluation circuitry 112 communicates data back to the hook circuitry 110 (arrow 7 of FIG. 3). The particular communication that is sent from the evaluation circuitry 112 to the hook circuitry 110 may depend on (i) whether the result of the image evaluation operation indicates that sensitive information is present in the image data and/or (ii) whether the specialized security circuitry 104 is set to operate in intrusive mode or non-intrusive mode.

For example, if the evaluation circuitry 112 determined that no sensitive information is present in the image data, the evaluation circuitry 112 provides the image data fully intact back to the hook circuitry 110 regardless of whether the specialized security circuitry 104 is set to operate in intrusive mode or non-intrusive mode. In some arrangements, the image data is accompanied by the image evaluation operation result signal which indicates that no sensitive information is present in the image data. Upon receipt of the image data, the hook circuitry 110 conveys the image data to the application circuitry 102 (arrow 8 of FIG. 3), e.g., for storage in a filesystem, for access by the user 32 in an image gallery, for transmission to a remote location, etc.

However, if the evaluation circuitry 112 determines that sensitive information is present in the image data, the evaluation circuitry 112 may provide different communications to the hook circuitry 110 depending on whether the specialized security circuitry 104 is set to operate in intrusive mode or non-intrusive mode. Along these lines, if the specialized security circuitry 104 is operating in non-intrusive mode, the specialized security circuitry 104 may nevertheless provide all of the image data from the camera circuit 100 to the application circuitry 102 (i.e., the capture image remains intact). Accordingly, the application circuitry 102 is then able to access the image data in the same manner as if sensitive information was not present in the image data.

However, if the specialized security circuitry 104 is operating in intrusive mode, the specialized security circuitry 104 may replace at least some of the image data with other data. In some arrangements, the evaluation circuitry 112 generates new image data that represents an image that is similar to the original image captured by the camera 30 but that omits the sensitive information (e.g., the sensitive information may be deleted in the visual image, replaced, blurred out, etc.). In other arrangements, the specialized security circuitry 104 outright block any image data from reaching the application circuitry 102 (e.g., the specialized security circuitry 104 may output nothing to the application circuitry 102, the specialized security circuitry 104 may prevent invocation of the application circuitry 102, the specialized security circuitry 104 may deactivate the application circuitry 102, and so on).

Moreover, the hook circuitry 110 may perform other reporting operations such as display a warning to the user 32 of the mobile device 22, log the event in an event log (see the other componentry 114), transmit an alert to a control server 24, and so on. Additionally, a copy of the image data may be saved locally (e.g., in the other componentry 114) and/or sent to the control server 24(B). Further details will now be provided with the reference to the alternative configuration in FIG. 4.

As mentioned above, FIG. 4 shows an alternative configuration for the various mobile device circuits. The alternative configuration is similar to the circuitry configuration shown in FIG. 3 and operates in a similar manner. However, in the alternative configuration shown in FIG. 4, the hook circuitry 110 of the specialized security circuit 104 is not interconnected between the camera circuitry 100 and the application circuitry 102. Rather, image data output from the camera circuitry 100 is allowed to flow directly to the application circuitry 102, and is further accessed by the hook circuitry 110.

During operation, as with the configuration shown in FIG. 3 and now with reference to the alternative configuration shown in FIG. 4, the control server 24(A) periodically sends security criteria to each mobile device 22 of the electronic setting 20 (e.g., see arrow 1 in FIG. 4). Such security criteria is now available to the evaluation circuitry 112. Furthermore, such security criteria may include scanning rules that detect matching confidential text information.

Then, at some time during operation of the mobile device 22, the application circuitry 102 sends a control signal to the camera 30 to activate the camera circuitry 100 (arrow 2 in FIG. 4). Along these lines, the user 32 may invoke a camera application (e.g., a photo app or movie app) and then direct the mobile device 22 to take a picture or create a video clip using the camera 30 of the mobile device 22. To this end, an application running on the mobile device 22 invokes the camera 30 to capture one or more image frames. The image data in each frame represents a visual image captured by the camera 30.

Next, in response to the control signal from the application circuitry 102, the camera circuitry 100 outputs the image data which is received by the application circuitry 102 (arrow 3 of FIG. 4) and processed by the application circuitry 102 (e.g., stored in a file, transmitted to an external device, etc.). Contemporaneously, the image data is received by the specialized security circuit 104 (arrow 4 of FIG. 4).

Upon receipt of the image data from the camera circuitry 100, the hook circuitry 110 of the specialized security circuitry 104 sends the image data to the evaluation circuitry 112 of the specialized security circuitry 104 for evaluation (arrow 5 of FIG. 3). In some arrangements, the image data is buffered in a portion of memory of the specialized security circuitry 104.

The evaluation circuitry 112 then performs an image evaluation operation based on the security criteria that was received from the control server 24(A) to determine whether the image data contains sensitive information (arrow 6 of FIG. 4). In some arrangements, the evaluation circuitry 112 extracts text data from the image data (e.g., text strings from the image). Along these lines, the evaluation circuitry 112 may perform recognition operations on the image data (e.g., operations such as optical character recognition or OCR operations that are performed on electronic scans of text). Next, the evaluation circuitry 112 analyzes the text data for confidential text information. For example, the security criteria may include a set of rules, and the evaluation circuitry 112 applies the set of rules to the text data to search for confidential text information.

The evaluation circuitry 112 then provides an image evaluation operation result signal indicating whether the image data contains sensitive information (arrow 7 of FIG. 4). This image evaluation operation result signal is sent to a local log (e.g., see the other componentry 114) and/or the control server 24(B). For example, if the image evaluation operation result signal indicates that sensitive information is present in the image data, both the local log and the control server 24(B) may be immediately updated with information of the event (e.g., an alert, a copy of the image data, etc.). However, if the image evaluation operation result signal indicates that no sensitive information is present in the image data, only the local log is updated if at all at the time of performing the image evaluation operation, and collected recent events in the local log are later sent to the control server 24(B) periodically. Other security protection operations and/or behaviors are suitable for use as well. Further details will now be provided with reference to FIG. 5.

Figure 5:
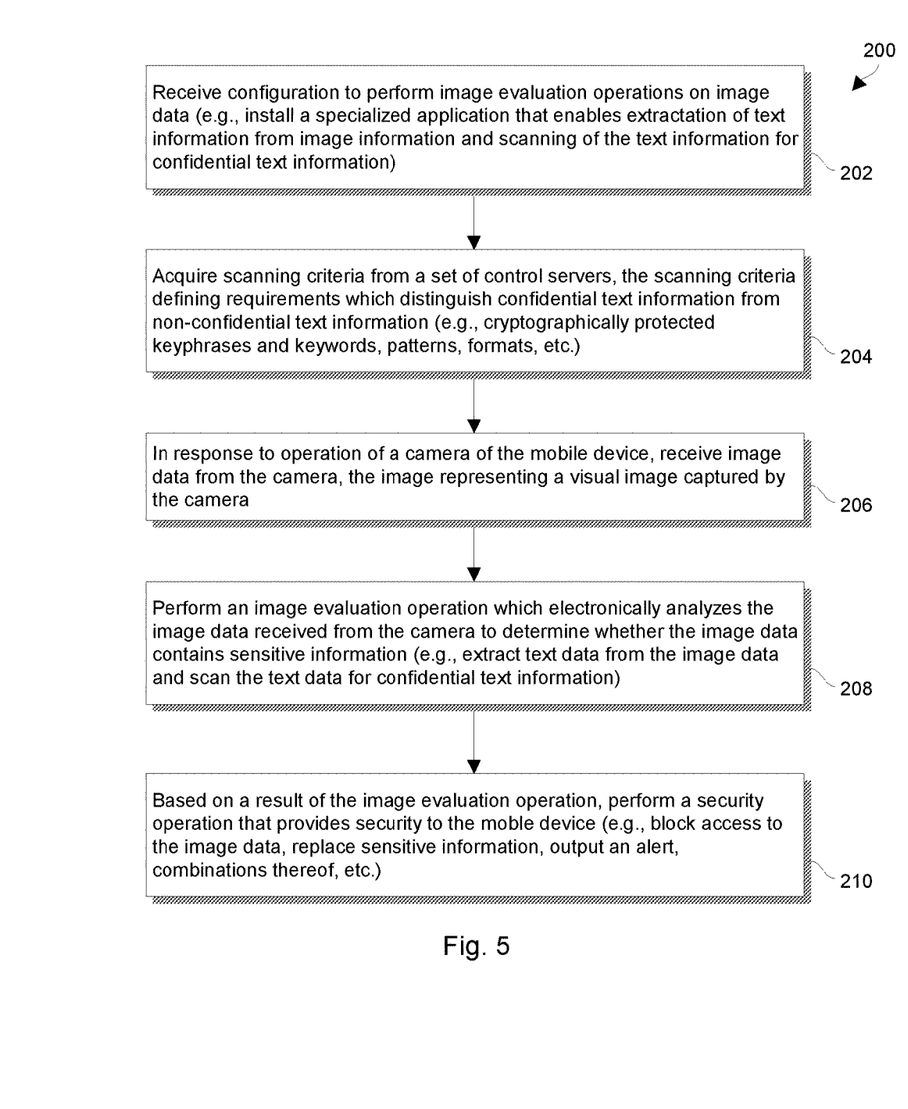
FIG. 5 is a flowchart of a procedure that is performed by the electronic setting of FIG. 1.

FIG. 5 shows a procedure 200 that is performed by circuitry of a mobile device of an electronic setting (also see FIG. 1). The procedure 200 provides security to the mobile device.

At 202, the circuitry of the mobile device receives configuration to perform image evaluation operations on image data. In some arrangements, such configuration involves installation of a specialized application within the mobile device. Such an application may include specialized code to extract text information from image information, and scan the text information for confidential data.

At 204, after the circuitry of the mobile device receives configuration, the circuitry of the mobile device acquires scanning criteria from a set of external control servers. Such scanning criteria defines requirements which distinguish confidential text information from non-confidential text information (e.g., cryptographically protected keywords and phrases, patterns, formats, conditions, statistics, etc.). In some arrangements, the acquisition of scanning criteria occurs routinely and/or transparently (e.g., periodic updates sent to the mobile device in a wireless manner and processed in the background).

At 206, in response to operation of a camera of the mobile device, the circuitry of the mobile device receives image data from the camera. The image data represents a visual image captured by the camera.

At 208, the circuitry of the mobile device performs an image evaluation operation which electronically analyzes the image data received from the camera to determine whether the image data contains sensitive information. Along these lines, the circuitry extracts text data from the image data and scans the text data for confidential text information. In some arrangements, the scanning criteria includes a set of rules that the circuitry applies to determine whether there is a match between extracted text and sensitive keywords or phrases.

At 210, based on a result of the image evaluation operation, the circuitry of the mobile device performs a security operation that provides security to the mobile device. For example, in certain intrusive mode arrangements, the circuitry may block conveyance of at least some of the image data from the camera to a set of applications running on the mobile devices (e.g., outright blocking conveyance of the image data, inhibiting invocation of the particular application, providing modified data that omits the sensitive information, and so on). Additionally, the circuitry may outputting a warning on a display screen of the mobile device that informs the user of the mobile device that (i) the image data received from the camera contains confidential text information and (ii) the confidential text information has not been provided to the particular application.

On the other hand, for certain non-intrusive mode arrangements, the circuitry performs a remedial security operation while the circuitry allows a particular downstream circuit (e.g., an application running on the mobile device's processing circuitry) to receive the image data for further processing. For example, the circuitry may send a report message that includes the sensitive information to the set of external control servers or a copy of the image data that is received by the particular downstream circuit.

In some arrangements, the results of the image evaluation operations are stored locally in a security event database within the mobile device (e.g., when sensitive information is detected, the circuitry logs a confidential text information release event). Concurrently or at a later time, the mobile device sends the results to a set of external control servers.

As described above, improved techniques provide security to mobile devices by performing image evaluation operations that electronically analyze image data received from cameras of the mobile devices. Such image evaluation operations indicate whether image data from the mobile device cameras contain sensitive information (e.g., confidential text information). If such sensitive information is discovered within a mobile device, conveyance of the sensitive information may be blocked from reaching one or more applications. Alternatively, the sensitive information may be permitted to reach one or more downstream applications, but a remedial operation may be performed by the mobile device such as warning the user, entering the activity in an event log, sending a copy of the sensitive information to a central server, and so on. Suitable mobile devices include smartphones, tablets, laptop computers, generic BYODs, and the like.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic setting 20 such as one or more control servers 24 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

It should be understood that disclosed herein are techniques for mitigating the security threat that a BYO device equipped with a camera may be used to take photos or video clips in a corporate work environment and cause leakage of sensitive (e.g. confidential) information. In contrast, existing BYOD security management systems are not smart enough to identify sensitive information from photos or video clips and anti-leakage functions may mainly target text or binary patterns existing in data streams such as email and text files. Furthermore, photography are either allowed or disallowed for the device globally. However, the improved technique enable detection of sensitive information contained in image frames captured by the camera of the device, and thus satisfy demand for both information security and user experience.

One should appreciate that data leakage through an optical channel, e.g., a screen display, is a major security challenge in computerized working environment. Sensitive information displayed on the end user's screen, including intellectual property, confidential business data, privacy information of clients etc., might be photographed and taken away by an insider or visitor either on purpose or unintentionally, causing loss to the corporate. The wide use of Bring Your Own Devices (BYOD) further augmented this security threat, as most mobile devices are equipped with one or more cameras which can take and distribute photos or video clips very conveniently.

To mitigate this threat, corporations have taken several countermeasures. One is to enforce the policy to disable the usage of cameras of any devices in corporate environment by physically sealing up the camera lens upon entry to the office or by enforcing the installation of only administrative software. This severely impacts the normal usability of mobile devices. Another is to keep a copy of every photo and video clip taken by the device for compliance check. This could lead to legal risk of intruding user privacy and also consumes excessive network bandwidth as well as storage space.

In accordance with certain embodiments, the improvements disclosed herein solve the dilemma by automatically identifying sensitive information from photos and video clips. Through this identification, special actions can be taken upon photos or videos suspicious of sensitive content, while non-suspicious ones are not impacted.

In some embodiments, administrative software is installed and activated on each mobile device 22 brought into a corporate environment. The mobile device 22 can then work in two modes: intrusive mode or non-intrusive mode. In intrusive mode, the mobile device 22 can intercept, modify and remove an image taken by another application using a camera. In non-intrusive mode, the mobile device 22 just monitors the image and reports the sensitive information detection result to administrators.

In some arrangements, the administrative software running on each mobile device 22 synchronizes a sensitive keyword set, i.e. "rules" from a central management server 24 through a push service. The sensitive keywords can contain wildcards or regular expressions so that fuzzy matching can be supported.

While such administrative software (or code) runs on a mobile device 22, the software takes control of, i.e. "hooks" the camera driver of the mobile device 22 so that each frame captured by a camera 30 can be inspected. The hooking mechanism varies by each mobile OS and by the working mode (e.g., intrusive vs. non-intrusive). A higher privilege may be required for enabling intrusive work mode. For example, in Android 7.0™, the intrusive work mode can be implemented by running as root and creating a proxy for the android.hardware.camera2 class, while the non-intrusive work mode can be supported by simply requesting the device administration privilege and registering for camera device notifications.

In some arrangements, whenever an image frame has been captured through any camera by any application, the administrative software invokes a detection module that utilizes OCR algorithm to extract all text strings from the image frame, then does a pattern match against the rules. One or more successful matches against any rule is considered a detection.

Also, in some embodiments and depending on the detection result and work mode, a pre-defined appropriate non-intrusive or intrusive action can be taken toward an image frame that contains sensitive information. Examples for non-intrusive actions are: logging an event, reporting the activity and keyword to control server, uploading a copy of the image to control server. Examples for intrusive actions are: failing the camera invocation of the application, scratching off the sensitive text, removing the photo or video file, popping up a warning message to end user.

Additionally, in some arrangements, it should be understood that the scanning criteria includes rules which are encrypted using a crypto algorithm (e.g. SSL) during the process of downloading from a control server 24 server to a mobile device 22. Such encryption mitigates the risk that the rules are sniffed over the communication channel.

Furthermore, in some arrangements, the rules are decrypted but stored in secured memory structures which are not directly accessible by other applications. In these arrangements, matching may be performed via secure APIs instead of directly matching strings/patterns in memory, or, alternatively, the decrypted rules are erased from the memory at once after the matching is done. Such operation mitigates the risk that the rules are obtained from the system RAM by the end user 32 or by anyone who currently hold the device.

Additionally, in some arrangements, the rules are defined as general enough to cover a class of sensitive data. For example, the regular expression:

"^(\+1)|(1) \d{3} \d{3}-\d{4}$"

may match to a non-mobile telephone number in certain formats in the United States. In some arrangements, the original text of specific sensitive information, e.g. a password in use, is not defined as a rule directly.

Furthermore, in some arrangements, in order to support the option to remove certain text from the image in intrusive mode, an OCR detection module has the ability to return the text area which exactly contains the matched text. Accordingly, the circuitry is able to provide new image data that is similar to the original image data but that does not contain the sensitive information.

Additionally, the above-described architecture and/or control flow may be applied or combined with other services. For example, such architecture and/or control flow is suitable for use with remote desktop sessions, or similar virtual desktop architectures to monitor images captured through a redirected camera from a client device. Such modifications and enhancements are intended to belong to various embodiments of the disclosure.

What is claimed is:

1. In a mobile device, a method of providing mobile device security, the method comprising:
   in response to operation of a camera of the mobile device, receiving image data from the camera, the image data representing a visual image captured by the camera;
   performing an image evaluation operation which electronically analyzes the image data received from the camera to determine whether the image data contains sensitive information; and
   based on a result of the image evaluation operation, performing a security operation that provides security to the mobile device;
   wherein the image evaluation operation provides an image evaluation operation result signal;
   wherein performing the security operation that provides security to the mobile device includes:
   in response to the image evaluation operation result signal indicating presence of confidential text information within text data extracted from the image data, performing a remedial security operation while a particular application receives the image data for processing; and
   wherein performing the remedial security operation while the particular application receives the image data for processing includes:
   in response to the image evaluation operation result signal indicating the presence of the confidential text information within the text data, logging a confidential text information release event entry within a security event database within the mobile device;
   wherein logging the confidential text information release event entry within the security event database within the mobile device occurs while the mobile device operates in a non-intrusive mode; and
   wherein the method further comprises:
   switching the mobile device from the non-intrusive mode to an intrusive mode in which the mobile device intercepts and removes a second visual image captured by the camera in response to the mobile device determining that the second visual image contains sensitive information.

2. A method as in claim 1, further comprising:
   prior to receiving the image data from the camera, configuring processing circuitry of the mobile device to operate as a text extraction circuit that extracts text information from image information; and
   wherein performing the image evaluation operation includes:
   processing the image data received from the camera via the text extraction circuit to extract the text data from the image data, and
   scanning the text data extracted from the image data for the confidential text information.

3. A method as in claim 2, further comprising:
   after configuring processing circuitry of the mobile device to operate as the text extraction circuit and prior to receiving the image data from the camera, acquiring scanning criteria from a set of external control servers, the scanning criteria defining requirements which distinguish confidential text information from non-confidential text information.

4. A method as in claim 3 wherein acquiring the scanning criteria from the set of external control servers includes:
   obtaining the scanning criteria from the set of external control servers via a wireless transmission that uses a wireless transceiver of the mobile device.

5. A method as in claim 3 wherein the scanning criteria from the set of external control servers includes a set of rules; and
   wherein scanning the text data extracted from the image data for the confidential text information includes:

applying the set of rules to the text data extracted from the image data to discern confidential text information within the text data.

6. A method as in claim 3 wherein the image evaluation operation provides an image evaluation operation result signal; and
wherein performing the security operation that provides security to the mobile device further includes:
in response to the image evaluation operation result signal indicating presence of confidential text information within the text data, blocking conveyance of at least some of the image data from the camera to a set of applications running on the mobile devices.

7. A method as in claim 6 wherein the camera captures the image data in response to a control signal from the particular application; and
wherein blocking conveyance includes:
in response to the image evaluation operation result signal indicating the presence of the confidential text information within the text data, preventing at least a portion of the image data from being accessed by the particular application.

8. A method as in claim 7 wherein preventing includes:
in response to the image evaluation operation result signal indicating the presence of the confidential text information within the text data, inhibiting invocation of the particular application.

9. A method as in claim 7 wherein preventing includes:
in response to the image evaluation operation result signal indicating the presence of the confidential text information within the text data, generating modified data that represents the visual image captured by the camera and that excludes the confidential text information, and providing the modified data to the particular application.

10. A method as in claim 7 wherein preventing includes:
in response to the image evaluation operation result signal indicating the presence of the confidential text information within the text data, outputting a warning on a display screen of the mobile device that informs a user of the mobile device that (i) the image data received from the camera contains confidential text information and (ii) the confidential text information has not been provided to the particular application.

11. A method as in claim 1 wherein performing the remedial security operation while the particular application receives the image data for processing further includes:
in response to the image evaluation operation result signal indicating the presence of the confidential text information within the text data, sending a report message to a set of external control servers, the report message including the confidential text information.

12. A method as in claim 1 wherein performing the remedial security operation while the particular application receives the image data for processing further includes:
in response to the image evaluation operation result signal indicating the presence of the confidential text information within the text data, sending a report message to a set of external control servers, the report message including a copy of the image data that is received by the particular application.

13. A method as in claim 1 wherein performing the remedial security operation while the particular application receives the image data for processing further includes:
periodically transmitting at least a most recent portion of the security event database to a set of external control servers via a wireless transmission that uses a wireless transceiver of the mobile device.

14. A method as in claim 1 wherein performing the remedial security operation while the particular application receives the image data for processing includes:
in response to the image evaluation operation result signal indicating the presence of the confidential text information within the text data, outputting a warning on a display screen of the mobile device that informs a user of the mobile device that (i) the image data contains confidential text information and (ii) the confidential text information has been provided to the particular application.

15. A computer program product having a non-transitory computer readable medium that stores a set of instructions to provide mobile device security; the set of instructions, when carried out by electronic circuitry of the mobile device, causing the electronic circuitry to perform a method of:
in response to operation of a camera of the mobile device, receiving image data from the camera, the image data representing a visual image captured by the camera;
performing an image evaluation operation which electronically analyzes the image data received from the camera to determine whether the image data contains sensitive information; and
based on a result of the image evaluation operation, performing a security operation that provides security to the mobile device;
wherein the image evaluation operation provides an image evaluation operation result signal;
wherein performing the security operation that provides security to the mobile device includes:
in response to the image evaluation operation result signal indicating presence of confidential text information within text data extracted from the image data, performing a remedial security operation while a particular application receives the image data for processing; and
wherein performing the remedial security operation while the particular application receives the image data for processing includes:
in response to the image evaluation operation result signal indicating the presence of the confidential text information within the text data, logging a confidential text information release event entry within a security event database within the mobile device;
wherein logging the confidential text information release event entry within the security event database within the mobile device occurs while the mobile device operates in a non-intrusive mode; and
wherein the method further comprises:
switching the mobile device from the non-intrusive mode to an intrusive mode in which the mobile device intercepts and removes a second visual image captured by the camera in response to the mobile device determining that the second visual image contains sensitive information.

16. A mobile device, comprising:
a camera;
memory which stores a local application; and
control circuitry coupled to the camera and the memory; the memory storing instructions that, when carried out by the control circuitry, cause the control circuitry to:
in response to operation of the camera, receive image data from the camera, the image data representing a visual image captured by the camera,
perform an image evaluation operation which electronically analyzes the image data received from the camera to determine whether the image data contains sensitive information, and based on a result of the image evaluation operation, perform a security operation that provides security to the mobile device;

wherein the image evaluation operation provides an image evaluation operation result signal;

wherein the control circuitry, when performing the security operation that provides security to the mobile device, is constructed and arranged to:

in response to the image evaluation operation result signal indicating presence of confidential text information within text data extracted from the image data, perform a remedial security operation while a particular application receives the image data for processing; and wherein the control circuitry, when performing the remedial security operation while the particular application receives the image data for processing, is constructed and arranged to:

in response to the image evaluation operation result signal indicating the presence of the confidential text information within the text data, logging a confidential text information release event entry within a security event database within the mobile device;

wherein logging the confidential text information release event entry within the security event database within the mobile device occurs while the mobile device operates in a non-intrusive mode; and wherein the control circuitry is further constructed and arranged to:

switch the mobile device from the non-intrusive mode to an intrusive mode in which the mobile device intercepts and removes a second visual image captured by the camera in response to the mobile device determining that the second visual image contains sensitive information.

17. A method as in claim 1 wherein the mobile device is constructed and arranged to establish remote desktop sessions with a set of remote servers; and wherein receiving the image data from the camera includes:

intercepting images within a data flow of a remote desktop session established between the mobile device and a remote server.

18. A computer program product as in claim 15 wherein the method further comprises:

prior to receiving the image data from the camera, configuring processing circuitry of the mobile device to operate as a text extraction circuit that extracts text information from image information; and wherein performing the image evaluation operation includes:

processing the image data received from the camera via the text extraction circuit to extract the text data from the image data, and scanning the text data extracted from the image data for the confidential text information.

19. A computer program product as in claim 15 wherein performing the remedial security operation while the particular application receives the image data for processing further includes:

in response to the image evaluation operation result signal indicating the presence of the confidential text information within the text data, sending a report message to a set of external control servers, the report message including a copy of the image data that is received by the particular application.

20. A computer program product as in claim 15 wherein performing the remedial security operation while the particular application receives the image data for processing includes:

in response to the image evaluation operation result signal indicating the presence of the confidential text information within the text data, outputting a warning on a display screen of the mobile device that informs a user of the mobile device that (i) the image data contains confidential text information and (ii) the confidential text information has been provided to the particular application.

* * * * *